United States Patent
Sheldon

[15] 3,636,366
[45] *Jan. 18, 1972

[54] OPTO-ELECTRIC SCREENS PROVIDED WITH LIGHT-CONDUCTING MEMBERS

[72] Inventor: Edward Emanuel Sheldon, New York, N.Y.

[*] Notice: The portion of the term of this patent subsequent to Mar. 26, 1979, has been disclaimed.

[22] Filed: Sept. 22, 1966

[21] Appl. No.: 584,318

Related U.S. Application Data

[62] Division of Ser. No. 366,038, May 8, 1964, Pat. No. 3,286,087.

[52] U.S. Cl................................................250/227
[51] Int. Cl.............................G02b 5/14, H01j 39/00
[58] Field of Search..................................250/227

[56] References Cited

UNITED STATES PATENTS

| | | |
|---|---|---|
| 2,354,591 | 7/1944 | Goldsmith..........................350/96 X |
| 2,360,663 | 10/1944 | Eddy..................................350/96 X |
| 2,877,368 | 3/1959 | Sheldon..........................250/227 X |
| 3,027,477 | 3/1962 | Sheldon..........................250/227 X |
| 3,205,892 | 9/1965 | Sheldon..........................250/227 X |
| 3,265,892 | 8/1966 | Sheldon..........................250/227 X |
| 3,286,087 | 11/1966 | Sheldon..........................250/227 X |
| 3,324,326 | 6/1967 | Sheldon..........................250/227 X |
| 3,345,531 | 10/1967 | Sheldon..........................250/227 X |

Primary Examiner—Robert Segal
Attorney—Polachek & Saulsbury

[57] ABSTRACT

This invention relates to novel composite photoelectric screens characterized by the construction in which the supporting member for the photoelectric means is radiation transparent and is made of an array of said radiation-conducting fibers. The light-conducting fibers operate by the internal reflection and are arranged spatially in such a manner that they can transfer the radiation image across said support without any appreciable loss of resolution, contrast and brightness.

16 Claims, 13 Drawing Figures

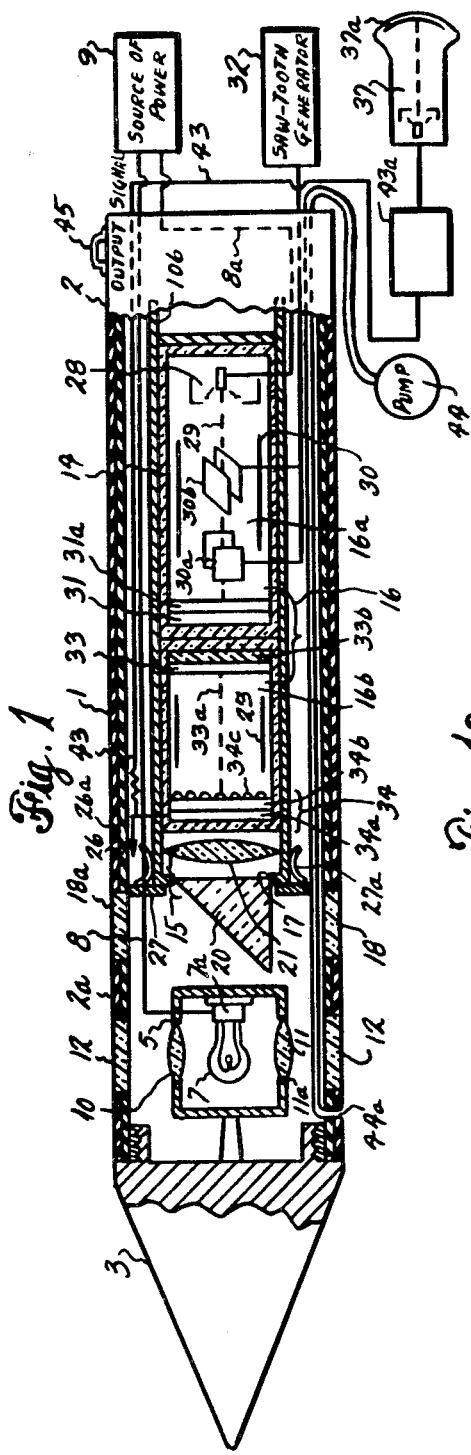

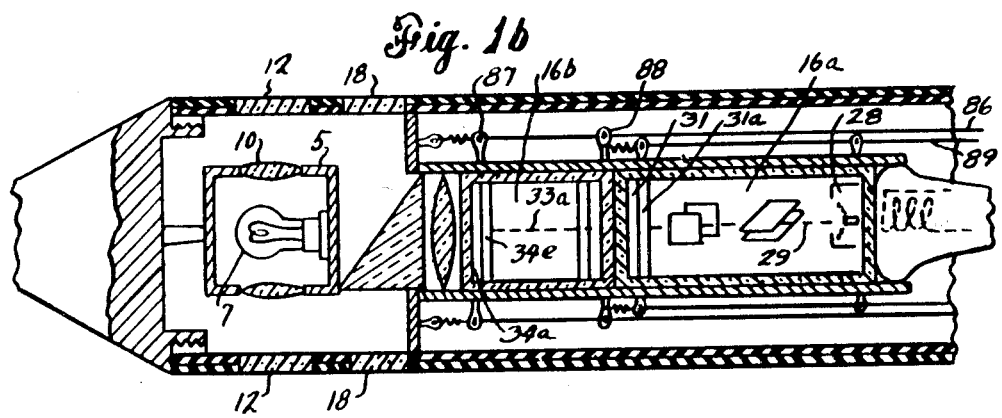
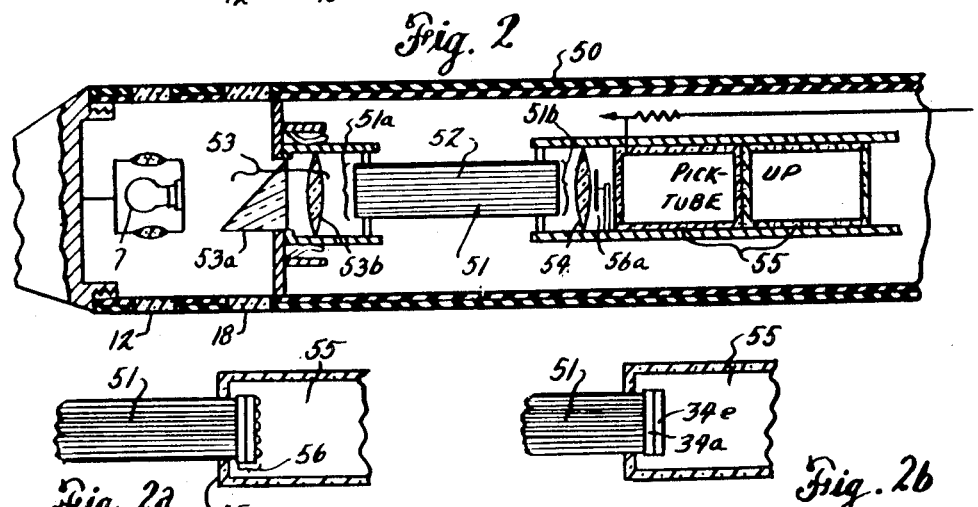
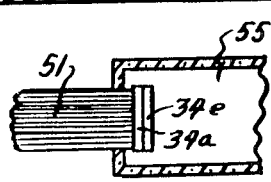
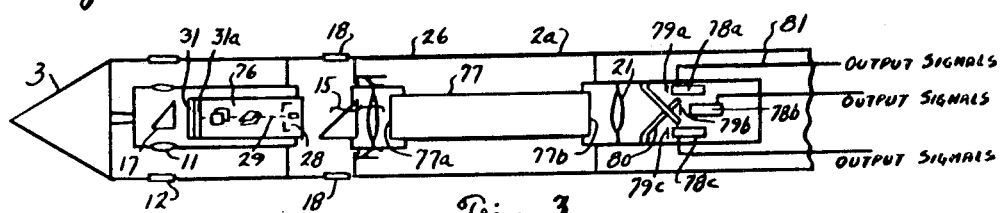
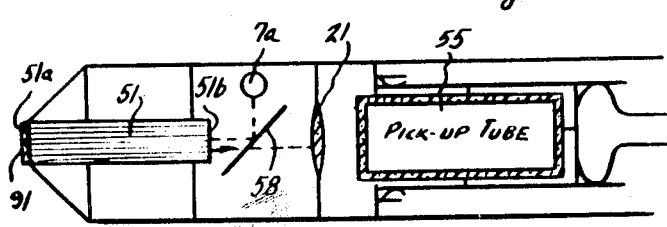

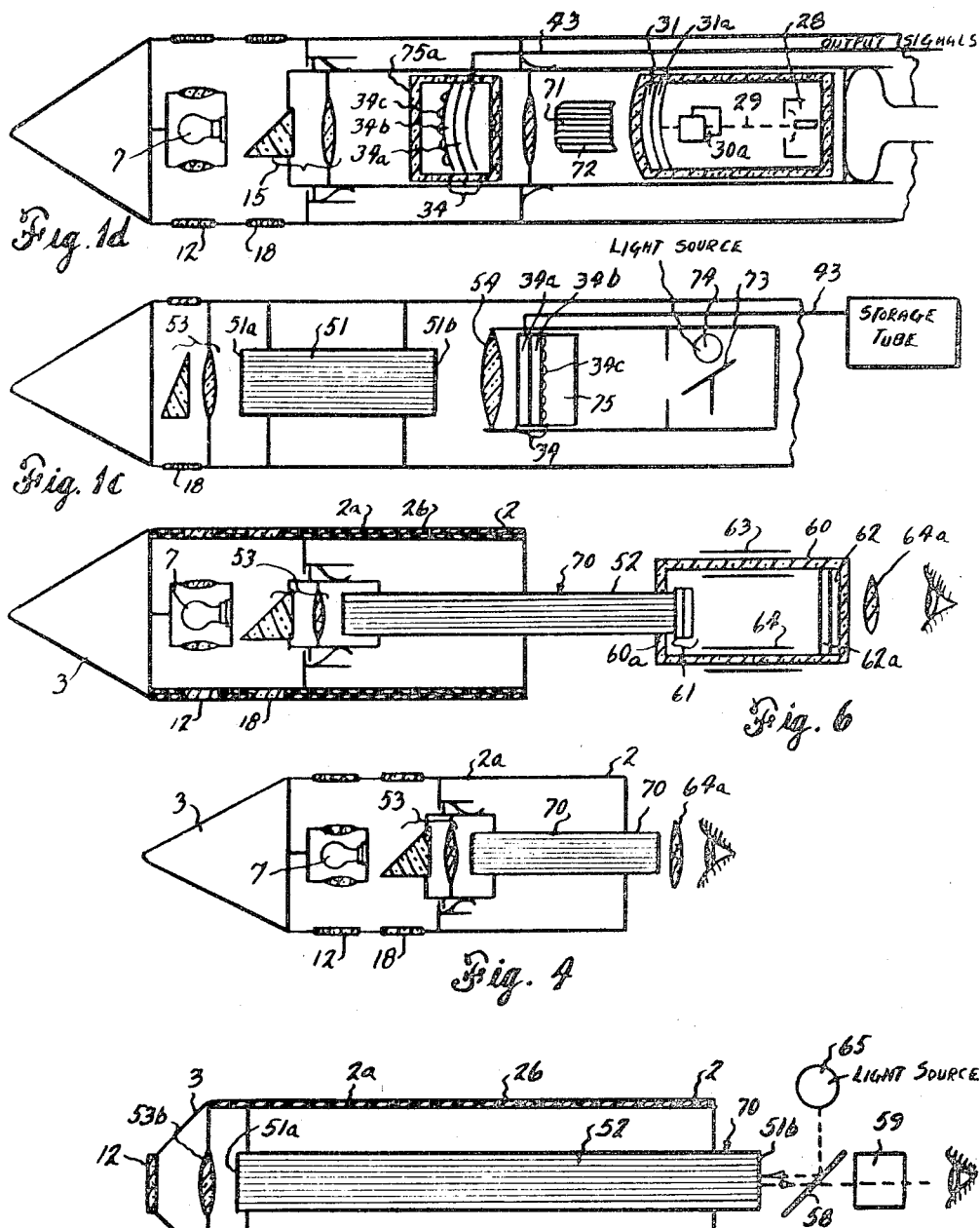

OPTO-ELECTRIC SCREENS PROVIDED WITH LIGHT-CONDUCTING MEMBERS

This invention relates to novel photoelectric instruments for the transfer images, and represents a division of my copending patent application Ser. No. 366,038, filed May 8, 1964, now U.S. Pat. No. 3,286,087; and which was a copending division of the patent application Ser. No. 170,745, filed on Feb. 2, 1962, and now U.S. Pat. No. 3,205,390 issued Sept. 7, 1965. The aforesaid U.S. Pat. No. 3,205,390, represents a copending division of U.S. Pat. No. 3,027,477, filed Jan. 9, 1959; which in turn was a copending division of patent application Ser. No. 415,669, filed March 11, 1954 now U.S. Pat. No. 2,877,368.

An objective of my invention is to intensify the image of the examined internal parts or passages so that the final image will be presented to the observer with the luminosity facilitating inspection of said image.

Another purpose of my invention is to enable simultaneous observation of said inaccessible parts by many examiners, situated in close or remote locations, which was not possible until now.

Another objective of this invention is to change, decrease or amplify the contrast of the image of the examined part.

The objectives of my invention were realized by a novel device which is flexible to allow its introduction into the examined part regardless of its curvatures or angulations and which after its introduction into the examined part will produce a light image of said part, will next convert said light image into video signals and will transmit said video signals outside of said part. Video signals are reconverted in receivers outside of the examined part into visible images for inspection or recording. My intrascopic device can produce black and white images, as well as multicolor images, showing faithfully or arbitrarily the colors of the examined part.

In particular this novel device makes use of a television pickup tube consisting of two separate independent elements which can be introduced separately into the examined part and which after introduction work in cooperation as a television camera. As each of these two separate elements is smaller in size than any conventional television camera can be made, this novel television camera can be introduced into locations which, because of small size or tortuous shape of passages leading to them, were inaccessible to the most miniaturized television cameras known in the art.

Another marked improvement in my novel television camera is elimination of magnetic deflecting coils which are bulky and occupy so much space that even a small television tube using them cannot be introduced into narrow passages. The use of conventional electrostatic deflecting system results into a marked distortion of images especially in pickup tubes using the slow-scanning electron beam. These drawbacks are eliminated in my intrascope and therefore in spite of its very small size it is capable of producing images of a good definition and contrast.

In some applications even this novel intrascope utilizing a pickup tube divided into two separate independent elements cannot be introduced into very narrow or tortuous passages. In such cases I am using a novel image conductor in combination with my television pickup tube. The novel image conductor consists of a flexible guide of material having a high index of refraction and critical angle of reflection which prevents the escape of the light from said guide. The novel image conductor may be of any desired size or shape and therefore it can penetrate the most inaccessible locations and can transmit the image therefrom to the television pickup tube or directly to the outside to the observer.

In the drawings:

FIG. 1 represents a partially sectioned view of the novel intrascope;

FIG. 1a, 1b and 1c show a modification of the intrascope;

FIG. 1d shows a intrascope with a simplified television camera tube;

FIG. 2 shows a combination of light image conductor with a television pickup tube;

FIG. 2a and 2b represent a modification of the combination comprising an image conductor and a pickup tube;

FIG. 3 represents a modified embodiment of my intrascope provided with image conductor;

FIG. 3a represents a modification of my intrascope in which image conductor is in contact with the distal end of the intrascope;

FIGS. 4 and 5 represent a simplified intrascope provided with a light image conductor; and FIG. 6 represents an embodiment of my intrascope provided with an image amplifying tube.

The new device which may be called the intrascope 1 is shown in FIG. 1. The handle 2 is a hollow tube of diameter corresponding to the examined part. The handle may be rigid or semiflexible or completely flexible according to the part to be examined. At the end of the handle begins the flexible part 2a of the intrascope which also has width and length suitable for the size of the examined part. In case the intrascope is used for examination of fragile parts, the part 2a must be very flexible and pliable in order to avoid damage to the wall of the examined part. The basic feature of the material for the flexible part of the intrascope is therefore that it must be easily bent and molded by the walls of the passages in which it is being introduced. Such material may be a suitable plastic, or rubber 26 of the type used by Davol Rubber Company of Providence, Rode Island, for their gastric tubes. In case the intrascope is used for investigation of sturdy parts or of machinery the part 2a may be obviously more rigid. The flexible part 2a of the intrascope may be in such a case made of the stainless steel spiral sheet designed not only for durability but also to maintain the proper degree of flexibility and elasticity. The metal spiral is tapered to insure its uniform bending. The intrascope may be covered with an outer tubing 26a such as of neoprene. This prevents dust particles and moisture from affecting the optical and pickup system located inside of the intrascope. At the end of the flexible part there is a semiflexible tip 3 which may be screwed on the flexible part and can be easily removed giving thereby access to the inner structures of the intrascope. The tip consists of a rubber conical finger and serves to facilitate the gliding of the intrascope within the examined part. In order to facilitate the introduction of the intrascope into parts which have no curves my device can be made semirigid by inserting into it a semirigid stilet. In case the intrascope is used as a probe for insertion into a solid object the tip 3 should be preferably rigid and sharply pointed to be able to pierce the examined object.

In some cases the examined part has to be distended by air or fluid insufflation prior to the examination. A special air pump attachment 44 and a channel 44a in the intrascope is provided for this purpose. The channel 44a also may serve to evacuate contents of the examined part before examination to improve visibility. The know 45 on the proximal end of the intrascope serves to indicate to the examiner the position of windows 12 and 18 of the intrascope. In some cases the layer 26 should be of a dielectric material to prevent any short circuits.

In the distal end of the flexible part of the intrascope there is a housing box 5 containing the illumination system 7. The box 5 may also be attached to the inner walls of the intrascope means of the brackets or may be held by springs. It is obvious that there are many means for attachment of the box 5 which are well known in the art. All walls of the housing box 5 except the one facing the television pickup tube 16 are provided with windows 10 for transmission of the light from the illuminating system 7. These windows are correlated with the windows 12 in the flexible part of the intrascope which transmit the light from the illuminating system to the examined part. In some cases the windows 12 may be made to extend over the circumference of the intrascope. In some cases the window to transmit illumination from the light source to the examined part may also be provided in the distal end of the intrascope instead of being in its sidewalls, and in such case the tip may be made of transparent material or may be omitted. Windows 12 may be provided with shutters which can be controlled from the proximal end of the intrascope which is outside of the examined part.

The illuminating system may consist of the electrical bulb 7. The electrical bulb may be mounted in the housing box 5 by means of a socket 7a. In some cases it is advantageous to use the objective lens 11 between the lightbulb and window 12 in order to concentrate the light on one field. The lens may be held in position by brackets 11a. The lightbulb is activated by the source of electrical power 9 situated outside of the examined part. Such a source may be the commercial electrical current or battery of dry cells. The flexible electrical cable 8 leads from the socket 7a to said outside source of electrical current 9. The cable is a lacquered, double insulated electric wire, is covered in addition with liquid rubber and is vulcanized in order to prevent a short circuit. The housing unit 5 may be in some cases omitted and the light source may be attached to the socket 7a which is held by brackets.

In the flexible part 2a proximally to the housing box 5, there is a rigid nontransparent housing compartment 14 containing the optical system 15 and the novel television pickup tube 16a and 16b. The housing 14 has an opening 17 in which the optical system 15 is lodged and which serves to admit the image of the examined part. This opening is correlated with windows 18 in the flexible part of the intrascope which transmit the image of the examined part. In some cases the windows 18 may be made to extend over all the circumference of the intrascope. The windows 18 may be provided with shutters operated from the proximal end of the intrascope which is externally to the examined part. The housing 14 containing the television pickup tube 16a and 16b and the optical system may be attached to the inner wall of the flexible part 2a of the intrascope by means of brackets or may be held by springs 27a. As the housing box fits into the encasing holding member 26 and is held by it tightly, in some cases no additional supporting means such as springs are necessary.

The optical system 15 may consist of 90° gable prism 20 and of lens 21. The optical system may have its own housing unit instead of being lodged in the compartment 14 and may be then introduced into the intrascope separately.

In some cases it is desirable to have a large field of vision and at the same time to preserve the necessary magnification of the examined part. In such a case instead of the prism 20a rotating mirror should be used. The mirror has first surface coating which eliminates the reflections and is activated by the magnetic solenoid placed beneath the mirror. The solenoid is connected by the elastic cable with the controls outside of the examined part and can tip the mirror from the retrograde position to the forward position giving thereby an additional field of vision without the necessity of moving the intrascope. The image of the examined part is reflected by the mirror on the objective lens which focuses said image on the photocathode of the novel television pickup tube 16b described below. In case the magnification of the examined part is not necessary a large field of vision can be obtained by using the lens providing 80° field of vision instead of the usual 45°–50°. The image produced by the optical system is inverted but it can be reverted to the original position either by an additional lens or electron-optically in the viewing tube. The rotating mirror may also serve to admit image either through window 18 or 18a without rotating the whole camera 16.

The housing box 14 contains the novel miniature television camera 16 which was designed to reduce to the minimum the size of the television camera. The television pickup tubes known previously in the art could be miniaturized only to a certain degree, which was not sufficient in certain applications as some of the examined parts and too small to allow the introduction even of the smallest conventional pickup tube. This is true especially for the type of tubes having external deflecting coils such as of magnetic or electromagnetic type, and in such situations, my novel camera 16 will be very suitable as it does not require any external deflecting or focusing coils at all. The camera 16 consists of two vacuum tubes 16a and 16b. The tube 16a has an electron gun 28 which produces an electron beam 29. The electron beam 29 is focused by electrostatic field 30. The electron-optical system for focusing the electron beam 29 may be simplified and markedly reduced in length by using the unipotential electrostatic lens instead of the usual two-lens system. The electron beam 29 is deflected by electrostatic plates 30 a and 30b in two perpendicular to each other planes. The electrostatic plates are energized by signals from saw tooth generators 32 which are situated outside of the examined part. The generators 32 are connected with electrostatic plates 30a and 30b by means of flexible wires. One deflecting field is produced by the horizontal deflection plates 30a and may have line frequency such as 5 – 15,000 cycles per second. Another deflecting field is provided by the vertical deflection plates 30b and may have field frequency such as 15–60 cycles per second. In this way the electron beam 29 is made to scan the fluorescent screen 31 in a regular television raster. The deflection system may be further simplified and miniaturized by having only horizontal deflection plates 30a. The vertical deflections 30b are eliminated and the vertical deflection of the fluorescent light spot is provided by the rotating drum 71 with plural mirrors 72 as shown in FIG. 1d. The fluorescent screen 31 may be provided with electron-transparent metallic conducting backing layer 31a such as of aluminum. The fluorescent screen 31 must be of a phosphor of a very short persistence in order to obtain a good resolution of the image. ZnO has decay time of 1 microsecond and is suitable for this purpose. Still better results may be obtained by means of ZnS phosphor and using only ultraviolet component of its fluorescent emission which has decay time of one-tenth microsecond. In some cases, it is preferable to make the fluorescent screen 31 of semispherical curved shape as it will improve definition of the flying light spot. The fluorescent layer 31 may also be deposited on the supporting mesh screen instead of being deposited on the wall of the vacuum tube. This will improve definition of the flying light spot.

The vacuum tube 16a operates in combination with the vacuum tube 16b forming together the novel television camera 16. The vacuum tube 16b has a photoemissive electrode 33 which may be deposited or attached to one of the walls of said vacuum tube. In some cases it is preferable to provide a light-transparent conducting layer 33b such as of material known in the trade as "Nesa," or of compounds of tin or of cadmium, on the side of said photoemissive electrode 33 facing the fluorescent screen 31. The photoemissive electrode 33 may be of CsOAg or of caesium, lithium or rubidium on antimony, arsenic or bismuth. At the opposite end of the vacuum tube 16b there is provided photocathode 34 which consists of a light-transparent signal plate 34a, a light-transparent insulating layer 34b and of a photoemissive mosaic 34c. The signal plate 34a may be a thin transparent layer of metal or other conducting material. The insulating layer 34b may be of mica, silica, or other transparent dielectric material and photoemissive mosaic 34c may be of CsOAg or of caesium, rubidium or lithium on antimony, arsenic or bismuth. In some cases the photoemissive layer 34c may be, instead of a mosaic, also of continuous type. In cases in which electrostatic focusing field 23 is used to focus the scanning electron beam 33a on the mosaic 34c, much better resolution will be obtained by making such mosaic of a curved semispherical shape. In addition, the use of such spherically shaped photocathode will eliminate instability of the image which is very marked when using electrostatic fields for focusing a slow electron beam.

The light image of the examined part is projected by the optical system on the photocathode 34 of the vacuum tube 16b. The light image produces emission of photoelectrons from the layer 34c. As a result a positive charge image having the pattern of said light image is left on the photoemissive mosaic 34c. Both vacuum tubes 16a and 16b are held in apposition to each other and in such a manner that the fluorescent screen 31 of the vacuum tube 16a is adjacent to the photoemissive electrode 33 of the tube 16b. The scanning electron beam 29 imprinting on the fluorescent screen 31 produces a light spot at each point of its impingement. The scanning illumination excites the photoemissive electrode 33 and produces thereby a fine scanning beam of photoelectrons 33a. The photoelectron beam 33a is the scanning type because it is produced by the scanning electron beam 29. The photoelectron beam 33a may be further focused by electrostatic fields 23. In some cases the photoemissive electrode 33 and the mosaic 34 are disposed so close to each other that the focusing fields may be eliminated which will further reduce the size of the vacuum tube 16b. When the focusing fields are omitted I found that separation of electrode 33 and mosaic 34 should not exceed 0.25 millimeter.

In a vacuum tube 16b instead of the photoemissive mosaic I may also use a photoconductive photocathode such as shown below in FIG. 2b. The photoconductive photocathode comprises a conducting signal plate 34a which is connected to the circuit producing video signals and a photoconductive layer 34e deposited thereon as shown in FIG. 2b. The photoconductive layer may be of selenium, zinc selenide or of antimony sulfide or of other photoconducting materials.

Another important modification of the vacuum tube 16b was accomplished by eliminating the photoemissive electrode 33. In this embodiment of invention as shown in tube 75 in FIG. 1c, the fluorescent light scans directly the photoemissive mosaic 34c. The emission of photoelectrons from the photoemissive mosaic 34c produces signals in the capacitatively coupled signal plate 34a. These signals are converted into video signals in the manner well known in the art.

In examination of stationary objects my intrascope may be further simplified by using as a source of scanning light instead of a vacuum tube 16a, a steady source of light such as an electrical bulb 74 in combination with an oscillating mirror 73 or rotating drum as shown in FIG. 1c. The oscillating mirror or drum is limited in frequency of oscillations therefore video signals produced by this device must be stored until the whole image is assembled. It is also possible to use instead of a storage tube for video signals, a receiver tube such as a kinescope having "memory screen" such as "dark trace" screen. Also a facsimile receiver can be used for this purpose. The pickup tube 75 may be also simplified by eliminating the electrode 33 as was explained above. The oscillating mirror may be on a pivot and may be energized by solenoids through which the current of high frequency is flowing. One set of coils serve to move the mirror in horizontal axis. Another set of coils is vibrating the mirror on vertical axis. The action of both coils makes the mirror oscillate in such a manner that the light reflected by said mirror will scan the area on which it is projected in the same manner as the flying spot which is produced by a cathode-ray tube. The construction of an oscillating mirror is well known in the art and it is believed therefore that its further detailed description will only serve to complicate the drawings.

The electron beam 33a may be of high velocity such as used in the iconscope type of television pickup tubes or may be of a slow velocity. In this embodiment of my invention, I use the slow-scanning electron beam. It is to be understood however that the fast-scanning electron beam may be used in my invention as well. The electron beam 33a scanning across the charge image stored in the mosaic 34c converts said image into electrical signals which appear at the signal plate 34a. These electrical signals can be converted into video signals over the resistance in the manner well known in the art. The video signals are transmitted by the flexible coaxial cable 43 from the intrascope within the examined part to the video amplifiers 43a outside of said part. The amplified signals are transmitted from the amplifiers to the viewing tube of kinescope type 37 and are reconstructed therein into the visible image representing the image of the examined part. The viewing tube may be of kinescope type and does not have to be described in detail as it is well known in the art. The examined part will appear on the fluorescent screen 37a of the viewing tube where it can be inspected by many examiners. Transmission of the image from the amplifier 43a to the viewing tube can be done by coaxial cable 43 or by high-frequency waves. The image can be sent therefore not only to the immediate, but also to the remote receivers or may be transmitted to multiple independent viewing tubes for the benefit of many examiners which was one of the objectives of this invention. The image on the viewing tube 37 may also be photographed simultaneously with the intrascope examination in order to make a permanent record which was another purpose of this invention.

The contrast of the reproduced image may be changed, diminished or increased according to the needs of particular examination by using amplifiers provided with variable $\mu$ tubes, or by the use of kinescope in which gamma can be controlled. The signal to noise ratio of this system and therefore the definition of the reproduced image may be improved by using in amplifiers discriminating circuits which reject signals below the predetermined amplitude and eliminate therefore most of the noise signals. The coaxial cable 43 within the examined part may be encased in the above described means 26 or 26a for inserting the intrascope or may be attached to them.

The voltages for the operation of the tubes 16a and 16b are supplied through the flexible elastical wires 8a from the source of the electrical power 9 outside of the examined part. In the same way the horizontal and vertical synchronizing circuits, focusing fields and deflecting circuits are supplied with electrical energy from the outside source of power 9. The synchronizing and deflecting circuits and focusing fields are not described in detail as they are well known in the art an it is believed they would only complicate the drawings. In some cases the coaxial cable 43 may be outside of said inserting means 26 or 26a.

The housing 14 containing the television camera can be rotated in its position in the intrascope, so that the optical system 15 can be made to face the window 18 or 18a and to "-see" thereby various areas of the circumference of the examined part. The rotation of the camera can be accomplished by means of a pusher 15a which fits into extensions 10b of the box 14. The rotation of the camera may be preferable in some cases to the rotation of the whole intrascope which allows to accomplish the same purpose.

The main rigid portion of the flexible intrascope is the television camera 16. Therefore the shorter the television camera is, the easier it will be for the intrascope to pass through sharply angulated or curved passages. One of the advantages of the novel pickup tube 16 is that it makes it possible to break up the smallest pickup tube into two component parts such as tubes 16a and 16b and introduce each of said tubes into the examined part separately, reducing thereby considerably the rigid portion of the intrascope which is due to the television camera, as shown in FIG. 1a.

To accomplish these objectives the flexible intrascope 1a is introduced first into the examined part while containing only the box 5 housing the light source 7. Inside of the intrascope 1a, shown in FIG. 1a proximally to the box 5 there is a ringlike partition which serves as a stop 27 for the pickup tube 16b which is to be introduced later. It is obvious that the shape of this stop may vary. The rest of the intrascope 1a is empty. The intrascope 1a is introduced first into the examined part. As the only rigid part of the intrascope is now the box 5 which is very small, this intrascope can easily pass even through very narrow and curved passages. After the intrascope 1a has been introduced into the examined part for a desired distance which can be read easily on the markings provided on the outside wall of the intrascope, the next step begins. Now the housing box 14b in which the vacuum pickup tube 16b is mounted is introduced into the intrascope. The housing box 14b is pushed into the intrascope, until it reaches the stop 27, which can be also ascertained by the X-ray control. The box 14b may be held against the stop 27 by spring extensions 27a, as shown in FIG. 1, on said stop 27. The housing box 14b may be pushed into its position by a flexible elastic guide 15a which is fitted into the proximal end of the housing box 14b. For this purpose the housing box 14b is provided with a ringlike extension 10a at its base which has springlike properties. The head of the flexible pusher 15a fits into this extension and is kept in position by it. The flexible pusher 15a may also be provided with electrical coils 6a at its distal end which is adjacent to the element to be introduced into the intrascope. The coils 6a are connected to the source of electrical power situated outside of the examined part. In this way, the head of the pusher may be given electromagnetic properties by closing the circuit, energizing said coils 6a. The pusher 15a will be held therefore in the elements to be introduced into the intrascope, such as boxes 14a, 14b or the optical system 15, not only by the mechanical pressure of the extensions 10a, or 10b, but by magnetic attraction as well. When the pusher 15a is to be withdrawn, the current supplying the coils 6a is shut off. To facilitate the guiding of the box 14b into the intrascope, a set of threads 86, as shown in FIG. 1b may be used which are at one end attached to the stop 27, and which are threaded through the perforations in the extensions 87 of the housing box 14b. After the box 14b has been introduced into its proper position in the intrascope, the pusher 15a is removed. Another set of threads 89 is attached to the extensions 88 in the housing unit 14b and serves to pull out said box 14b to the exterior of the examined part when the examination is finished. This arrangement is shown in FIG. 1b.

The housing box may be omitted in some cases and the tube 16b may be introduced into the intrascope without any housing and will be held in position by the same means as described above for holding the box 14b.

After the box 14b with the tube 16b has been introduced, the box 14a housing the tube 16a is introduced now into the intrascope in a similar manner as was described above. Both boxes 14b and 14a have openings at their proximal and distal ends respectively, which makes it possible to bring the fluorescent screen 31 of the tube 16a in close apposition to the photoemissive electrode 33 in the tube 16b. The boxes 14a and 14b are provided with mechanical means for securing a good contact of the proximal end of the tube 16b with the distal end of the tube 16a. One way of providing such a contact is to make the compartment 14a fit inside of the springlike flange 27a at the proximal end of the compartment 14b. The housing box 14a contains vacuum tube 16a which has been described above. The housing box 14a is provided with springlike extensions 10b which serve to accommodate the head of the pushing guide 15a.

The housing box 14a is pushed into the intrascope until it reaches the position of the stop 27b. This can be also checked by the X-ray control. The stop 27b is so situated that when the housing box 14a reaches it the tubes 16b and 16a will be in apposition to each other. In some cases flexible coils which can be converted into magnets by passing through them an alternating current from an outside source of electrical power may be provided on the stops 27 and 27b or at extensions 10a or 10b of the intrascope to help the positioning of boxes 14a and 14b. In this way the rigid portion of the intrascope which has to pass through a narrow passage or acute curvature is now only a fraction of the rigid part of intrascopes which use even the smallest pickup tube of conventional type. This represents an important improvement as it makes it possible to introduce the intrascope into parts which were not accessible previously to examination.

It should be understood that all my intrascopes can serve for producing and transmitting color images as well. The color system may be of mechanical type such as using a color wheel, or may be of electronic type, such as using an optical system to split the light image into its component colors and to project them on television pickup system.

In some applications even my novel intrascopic device cannot be introduced through the narrow or angulated passages. For such cases I designed a novel apparatus which will overcome even 180° to 360° bends in passages. FIG. 2 shows this embodiment of my invention. The intrascope 50 is provided with a novel image conductor 51. The image conductor 51 consists of multiple fibers of material having a high refractive index such as quartz, rutile or special plastics. In many applications the image conductor must be flexible and easily malleable. In such cases acrylic plastics such as Lucite or polystyrenes may be used. Especially Lucite is suitable for this purpose because it causes smaller losses of conducted light than other materials. Lucite and other above-mentioned materials characterized by a high refractive index have the property of internal reflection of the light conducted by them. Such materials cannot conduct a whole image as such but they can conduct well a light signal, it means an image point. The size of the image point I found is determined by the diameter of a single conducting fiber 52. In my image conductor I assembled a bundle of such fibers which form a mosaiclike end faces and which therefore can conduct plurality of image points. All these image points will reproduce at the other end face of the image conductor the original image provided that the image-conducting fibers remain in their original spatial relationship. Each fiber 52 should have, as was explained above, a diameter corresponding to the size of one image point. The diameter of 0.1 millimeter is well suitable for the purposes of my invention. In order to conduct an image of an area, e.g., of 1 square centimeter we must have many fibers 52, the number of fibers being dependent on the resolution of reproduced image that we desire. If the resolution of the conducted image should be four lines per millimeter, and if the image is of 1 square centimeter in size, we will need 40 fibers of 0.25 millimeter in diameter. As in many examinations it is not practical to be limited to the field of 1 cm.$^2$, I preferably use a few hundred of such fibers combined in one image conductor, which will allow to transmit an image of a large area.

The light-conducting fibers should be polished on their external surface very exactly. They may be also preferably coated with a very thin light opaque layer which should have a lower index of refraction than the light-conducting fiber itself. Such coating may have a thickness of only a few microns. I found a great improvement of flexibility of the light conductor 51 can be obtained by having the light-conducting fibers 52 glued together only at their end faces 51a and 51b. This is a very important feature of my device because the main requirement from the light conductor 51 is its flexibility and malleability. If the fibers 52 are glued together along their entire length the flexibility and malleability is so much reduced that it may be not possible to use it in many examinations in which the walls or passages are fragile and may be damaged by a rigid instrument. I found unexpectedly that having the conducting fibers 52 free along their path between the end faces will not cause any deterioration of the conducted image. I found that in spite of the fact that fibers between their end surfaces were freely movable there was no blurring of the conducted image. It must be understood however that the fibers 52 at both end faces of the conductor 51 must rigidly maintain their spatial relationship. Another important feature of this construction is that the diameter of the light conductor 51 can be now increased because no space consuming binder or glue is present between the fibers 52 except at their end faces. Instead of using the binder at the end faces of fibers 52, they may also be held together at their end faces by a fine mesh screen. Each fiber is threaded through one opening of said mesh screen and is being held by said screen in constant position.

It may be added that smaller losses of light may be obtained if the fibers 52 are hollow inside instead of being solid. An improvement in contrast of conducted images can be obtained by coating light conducting fibers 52 with an opaque material which eliminates the leakage of light from one fiber to the adjacent one.

The number of fibers that can be used in many examinations will be limited by the diameter of the passages through which my intrascope has to pass. As in many situations the channel may be only 1–2 cm. wide it will be impossible to use a great number of fibers. I succeeded to overcome this limitation, by using in combination the light conductor 51 with a demagnifying optical system 53. By the use of the demagnifying optical system I can reduce the examined field to the diameter of the image conductor 51. If the optical system will demagnify the image five times, I can examine the field having 25 cm.² with the image conductor having the diameter of only 1 cm.². This combination represents a very important feature of my invention as it is not always practical or feasible to limit the examined field only to the diameter of the image conductor. Another important feature of my optical system 53 is that it allows to project the image on the end face 51a of the light image conductor from which it can be transmitted to the other end of the conductor. If the image were projected on the side of the conductor 51 instead of on its end face, it would not be conducted at all. This is accomplished by means of the gable prism 53a.

The light-image conductor 51 may be introduced into examined part simultaneously with the intrascope. In some cases it is preferable to introduce my intrascope first and then insert the image conductor 51 or 70 into intrascope. In some cases the gable prism 53a or the whole optical system 53 may be attached to the end face 51a of the image conductor to make one unit. The novel intrascope 50 may have the same construction of other parts as was explained above and illustrated in FIGS. 1, 1a and 1b.

FIG. 2 shows the novel intrascope which comprises my novel image conductor system. The end face 51a serves to receive the image. As was explained above the image is projected on the end face 51a by the optical system 53 and is at the same time demagnified to reduce the size of the image to the size of the cross section of the image conductor 51. The image is conducted by the multiple flexible fibers 52 which form the image conductor to the end face 51b. The image emerging from the end face 51b is projected by the optical system 54 on the television pickup tube 55. If necessary the optical system 54 may be of magnifying type to enlarge previously demagnified image of the examined part. The television pickup tube 55 may be of the novel type described and illustrated in FIG. 1, 1a, and 1b. It should be understood however that all types of television pickup tubes can be used in my intrascope in combination with image conductor 51. The television pickup tube may be of conventional vacuum tube type. The television pickup tube may be of photoemissive type, photoconductive type, or photovoltaic type. The television pickup tube may be of velocity modulation type. The television pickup tube may use fast- or slow-scanning electron beam. The novelty of the combination of my image conductor with my television pickup system resides in the ability of the intrascope provided with this combination to penetrate into locations which were in accessible to my television pickup system and to transmit said image from said inaccessible locations to the television pickup tube. The television pickup tube can then transmit the image to the outside of the examined part by means of coaxial cables and it can do it regardless of the distance between the television tube and the outside. Therefore the combination of the image conductor with a television tube represents an important improvement in the art of the examining recesses inaccessible to direct visualization or to conventional optical systems. It should be understood that my system will be also capable of producing color images. For this purpose the revolving color wheel 56a may be provided in front of the television camera 55. Instead of the color wheel an optical system may be provided which splits the image into two or three color images and projects said images on different parts of the photocathode. It should be understood therefore that my invention may use all types of television pickup tubes which can produce color images.

I found that the image conductor 51 causes severe losses of light. This loss of light is dependent of the length of the image conductor, on the number of bends and angle of said bends to which image conductor is subject in its passage to the examined part. In some examinations the television pickup tube cannot be activated with the amount of light available after the passage through the image conductor, because the optical system 54 disposed between the image conductor and the television pickup tube causes an additional loss of 95 percent of useful light. In such cases I am using the embodiment of my invention shown in FIGS. 2a or 2b. In this modification of my invention the image conductor extends through the wall 55a of the pickup tube 55 inside of the tube. The photoelectric photocathode 56 is now deposited on the end face 51b of the image conductor. The photocathode 56 may be of the photoemissive type as shown in FIG. 2a or photoconductive type as shown in FIG. 2b. In this construction the loss of light caused by the optical system 54 is completely eliminated which represents a thirtyfold increase in light available for the television pickup tube and which makes the television pickup tube now responsive to the image. The image conductor is cemented to the end wall 55a of the tube 55 by the vacuum-type seal. In some cases it may be preferable to provide a support for the light-image conductor near the face 55a of the television tube to reduce the pull of the image conductor 51 against the wall of the pickup tube.

Another modification of my intrascope is shown in FIG. 3a. In this embodiment of invention the image conductor 51 has its end face 51a adjacent to the distal end of the intrascope. The window 91 can be opened by mechanical means which are well known in the art and the end face 51a of the image conductor 51 may be brought slightly forward. This will result in apposition of the image conductor with the examined part. In this embodiment of the invention the light source for illumination of the examined part may be provided at the proximal end 51b of the image conductor. The light source 7a projects the light onto mirror which has the property for partly reflecting and partly transmitting the light. Such mirrors are well known in the art and it is believed therefore that their detailed description is not necessary. The light reflected by the mirror 58 is conducted by the image conductor 51 to the examined part and forms an image thereof. This light is reflected next by the examined part and returns again through the image conductor 51 to the outside. As the mirror 58 is half-reflecting and half-transparent the image of the examined part can pass through the mirror 58 and be focused by the optical system on the photocathode of the television pickup tube.

Another preferred embodiment of my invention is shown in FIG. 3. The intrascope in this modification consists of a rigid part 2, flexible part 2a and semiflexible tip 3. The mechanical construction of these parts is the same as described above and does not have to be repeated. The internal image producing and transmitting structures of the flexible part 2a are completely different. In particular the illuminating system 7 is replaced in this modification by the flying spot kinescope. The miniature flying spot kinescope 16a or 76 was shown in FIG. 1 and is a vacuum tube provided with an electron gun 28 producing a fine beam of electrons 29, with circuits 30a and 30b for deflecting said electron beam in two mutually perpendicular directions and also having a screen 31 coated with a fluorescent material. The electron gun consists of an electron emission source and an electron-optical system to focus the electrons into a fine beam. The fluorescent screen of the kinescope must be of a phosphor of a very short persistence in order to obtain a good resolution of image. ZnO phosphor has decay time of 1 microsecond and is suitable therefore for this purpose. Still better results will be obtained by applying ZnS phosphor and utilizing only the ultraviolet component of its fluorescent emission, which has the decay time of one-tenth microsecond. The electron beam of the kinescope has to scan the fluorescent screen in a predetermined pattern. This scanning motion of the electron beam is obtained by the electrostatic or magnetic fields 30a or 30b, which produce deflection of said beam. This scanning electron beam 28 produces a scanning light spot which illuminates the examined part through window 12 and produces successive image points of said examined part. Successive image points are admitted through window 18 into intrascope and are projected by the optical system 15 on the end face of the image conductor 77. The image conductor 77 in this modification of my invention consists of a single rod of material, which is flexible and has a high index of refraction, such as lucite, acrylic plastics, polystyrenes or other materials. As was explained above, such materials cannot conduct an image. They can conduct a light signal only. In my novel device, the image is produced by a rapid succession of single image points. Each image point can be conducted by the conductor 77, because it represents only one signal. Each conducted image point, after it emerges from the conductor 77, is projected on a single or plural phototubes or photocells and is converted thereby into an electrical signal. If "black and white" image is sufficient, only one phototube 78 has to be used. The phototube converts, as was explained above, each light image point into an electrical signal. The successive electrical signals are conducted by flexible coaxial cables 81 to the outside of the intrascope and of the examined part. These transmitted electrical signals are next fed into appropriate receivers, such as kinescopes, facsimile receivers or skiatrons, known also as a "dark trace tube" and are reconverted into a visible image for inspection or for photographic recording. In case a color image of the examined part is necessary, we may use two or three phototubes or photocells. The phototube 78a will serve to receive red image points; phototube 78b will serve to receive red image points; phototube 78b will serve to receive green image points, and phototube 78c will receive blue image points. A white light image point may be split into its component colors by the use of suitable optical system. Dichroic mirrors 80 are useful for this purpose. It should be understood, however, that there are many optical means that can be used instead of said dichroic mirrors. In some cases, it is preferable to use, instead of dichroic mirrors, the rotating color disc 58a. The importance of this construction lies in the fact that I may use now one phototube or one photocell instead of three phototubes, which will markedly reduce the size of the intrascope. In this modification, the speed of the flying spot produced by the kinescope 76 has to be increased so that the whole examined area may be illuminated during the time in which one of three color filters of the disc 56 is in front of the single phototube 78. The rotating color wheel 56 may be set in motion by a miniature motor, such as used in electrical wrist watches, and which may be disposed within the intrascope. In such a case, the color wheel may be mounted on the shaft of said motor. In some cases it is preferable to have the motor disposed outside of the examined part. In such event, the motor may be connected with the rotating disc 56 by means of flexible cables or the power may be transmitted from the motor to the disc by pneumatic means or hydraulic means. The pressure exerted by the motor or a column of air or fluid is propagated by said pneumatic or hydraulic means to the disc and will cause its rotation.

The reproduction of color images may be improved by having in front of each phototube or photocell 78a, 78b and 78c, suitable filters 79a, 79b and 79c, which transmit only red, green and blue light respectively.

It should be understood that all types of phototubes or photocells may be used for purposes of my invention. In particular I may use phototubes of photoemissive type, of photoconductive type or photovoltaic type. The photocells having silicon, germanium or bismuth in combination with antimony or aluminum with antimony are most suitable because such photocells show high-frequency response, which is necessary for the operation of my device. Also modified phototransistors, which have a large photosensitive surface in contradistinction to the conventional ones, in which the photosensitive area is very small, may be used in my invention.

It may be added that when dealing with short distances, which do not cause a prohibitive loss of light, the light conductor 77 may extend to the outside of the examined part add the image then may be examined directly without the need of conversion of light-image points into electrical signals, as was explained above and illustrated in FIG. 3. In such cases the image points which appear successively at the end face 77b of the light conductor 77, may be projected by an optical lens and may be seen by the examiner directly because, due to the persistence of vision, the successive image points conducted by the conductor 77 will reproduce a total image in the retina of the examiner.

In some cases the light conductor 77 does not have to extend to the outside of the examined part, but it may be used in combination with an optical system, which will deliver the light image from the end face 77b of the conductor to the outside of the examined part. This arrangement is feasible only in locations in which the course of the examined passages between the end face 77b of the conductor and the outside is well known in advance, so that a suitable optical system can be provided.

In some applications where the distance between the examined part and the outside is small, also the image conductor which consists of plurality of fibers conducting light may be used without a television system. This embodiment of my invention is shown in FIG. 4. The light image produced by the light source 7 is conducted by the image conductor 70 to the outside where it can be examined visually, recorded or photographed. In some cases the light conductor 70 does not have to extend to the outside of the examined part because the course of the examined part becomes straight. In this event it is preferable to combine the light image conductor with an additional optical system which will project the image from the intrascope to the outside of the examined part.

Another embodiment of my invention is shown in FIG. 5 in which the light source is disposed outside of the examined part and is projected onto the end face of the image conductor 70 by the half-reflecting and half-transparent mirror 58, as was explained above.

The light image of the examined part which is transmitted by the image conductor 70 to the outside in some cases may be too weak for visual inspection and may require dark adaptation of the eyes. In such cases the image will be also too weak for photographing. For such examinations I made a modification of my invention which is shown in FIG. 6. In this embodiment of my invention the image conductor 70 is inserted into vacuum tube 60 through its wall 60a. The photocathode 61 of the vacuum tube which may be of photoemissive type or photoconductive type is deposited on the end face 51b of the image conductor. The light emerging from the end face 51b can now excite the photocathode 61 as the optical system is eliminated, which as was explained is causing a prohibitive loss of light. The electrons emitted from the photocathode 61 are imaged by magnetic or electrostatic lenses 64 and are focused on the fluorescent screen 62 disposed at the other end of the tube and protected by the light-reflecting layer 62a such as of aluminum. The electron image may be also intensified by accelerating fields 64. Furthermore it may be intensified by electron-optical diminution which results in an increase in intensity proportional to the square power of linear demagnification.

This may be accomplished by means of electromagnetic 63 or electrostatic lenses 64. The electrostatic lenses may be in the form of series of cylinders or rings of progressively smaller diameter. They are disposed inside of the tube and are connected to an outside source of potential. The magnetic or electromagnetic lenses may be in the form of coils surrounding the tube from outside. Such coils may be tapered or may be in the form of a short coil extending from some point between the photocathode 61 and the fluorescent screen 62, up to said fluorescent screen 62. The intensified image which appears on the fluorescent screen can be inspected visually by the observer directly or may be first magnified by an optical eyepiece 64a. The optical magnification of the electron-optically diminished image does not result in its loss of brightness as long as said magnification does not exceed certain limits. In this way the intensification of the image obtained by means of electron-optical diminution is not lost although the image is magnified again optically. Therefore the image of the examined part which was too weak for examination can now be presented with necessary brightness.

The use of the image tube 60 may also be necessary when using as an image forming radiation an invisible radiation such as ultraviolet or infrared. In cases of which the preservation of light is not critical it may be possible to project the image emerging from end face 51b of the image conductor 70 on the photocathode 61 of the image tube by optical means. In cases in which the definition reproduced image is not important, the end face 51b of the image conductor 71 may be attached to the end face of the image tube to be in tight apposition to the external surface of the image tube 60. The thickness of the wall of the image tube 60 which separates the end face 51b of the image conductor from the photocathode 61 will cause however a marked blurring of the image. The image tube may be also advantageously used within the intrascope in order to intensify the weak image emerging from the end face of the image conductor before it is being projected on the television pickup tube. In this embodiment the image tube has to be of miniature size. This can be accomplished by eliminating focusing electrodes and bringing the photocathode 61 very close to the fluorescent image-reproducing screen 62 to prevent blurring of electron image.

In some cases it is preferable to use as the light 7a or 65 for illumination of the examined part a polarized light. The image conducted by the image conductor to the observer is not polarized any more due to multiple reflections. Therefore by providing means which will stop the polarized light from reaching the observer but will transmit the nonpolarized light, the contrast of the examined part will be markedly improved. This construction is of critical importance, in devices in which the light for illumination of the examined part has to be delivered to the examined part by the same image conductor which serves to return the image to the observer. There are many ways in the art to eliminate the polarized light. FIG. 5 shows one of the means suitable for the purpose of this invention. The rotating prism 59 serves to stop the polarized light from the source 65 and it will at the same time transmit the nonpolarized light. The resulting improvement in contrast will make my device operative in many cases in which without this improvement it would not be feasible to examine the received image.

It should be clearly understood that all my intrascopes can serve and produce and transmit color images as well.

It is also to be understood that in some applications the encasing means for the image conductor or for pickup tubes may be omitted.

My invention is not limited to visible light images. All my intrascopes may be made responsive to invisible images on either side of visible spectrum by using appropriate photosensitive layer in the photocathode of the television pickup tube. It is to be understood that all my intrascopes may serve for receiving images formed not only by various electromagnetic radiations such as ultraviolet, infrared, etc., but also by particles radiation such as neutrons, alpha particles, protons, electrons or by ions. In such cases the photocathode of the pickup tube described above may be provided with an atomic particles sensitive phosphor on the side facing said image, or may have a special electron or other atomic particles emissive photocathode.

The embodiment of my invention illustrated in FIG. 5 may be also modified by using instead of the image conductor 70, which consists of plural fibers 52, the conductor 77, which consists of one solid rod of material conducting light, as was explained above. In order to make this modification operative, I found that the source of light must be able to produce a scanning light illumination. Therefore, instead of the electrical bulb 65 I am using in this embodiment of my invention the flying spot of light produced by a vacuum tube 16a or 76, as was described above. The remaining parts of my device may be the same as shown in FIG. 5.

It is evident that in all embodiments instead of the lamp 7 or 7a, the flying spot tube 16a or 76 may be used as well.

I also found that the novel image conductors 51, 70 or 77 may transmit not only white light but also infrared light and ultraviolet light. It is to be understood therefore that the term "light" as used in my disclosure embraces the visible light as well as the invisible.

It should be understood that in all embodiments of invention the source of image forming radiation may be disposed outside of the examined body and projected into the examined body by a suitable optical system or by light conductors described above.

Another important discovery was that supersonic waves can be also conducted by the conductors 51, 70 or 77. By using as a source of image forming radiation piezoelectric or magnetostrictive means, we may produce supersonic images of the examined part. Piezoelectric means may be in the form of oscillating crystals of quartz, titanate compounds, Rochelle salts and other similar materials.

As various possible embodiments might be made of the above invention, and as various changes might be made in the embodiment above set forth, it is to be understood that all matter herein set forth or shown in the accompanying drawings is to be interpreted as illustrative and not in a limiting sense.

What I claim is:

1. A composite photoelectric screen comprising in combination photoelectric means and rigid supporting means, said supporting means transferring an image of electromagnetic radiation across their thickness and having a two-dimensional cross section and a two-dimensional end face, said supporting means comprising a plurality of fibers conducting said radiation by internal reflection, the ends of said fibers forming an end face of said supporting means, said ends being united together at said end face, said fibers constituted of a member of material transparent to at least a part of said conducted radiation and of a high index of refraction, said members having a smooth external surface reducing the escape of said radiation from said members, said members having coating means separating said members from each other, said coating means of material of a lower index of refraction than said members reducing further the escape of said radiation from said members, said coating means furthermore having the thickness not exceeding a few microns, said photoelectric means mounted on said end face and receiving said conducted image radiation.

2. A device as defined in claim 1, in which said photoelectric means are mounted in contact with said end face.

3. A device as defined in claim 1 which comprises light-opaque means mounted between said members and in which said photoelectric means are mounted on the end face of substantially all said members.

4. A device as defined in claim 1 which comprises light-opaque means mounted between said members.

5. A composite photoelectric screen comprising in combination photoelectric means and rigid supporting means, said supporting means transferring an image of electromagnetic radiation across their thickness and having a two-dimensional cross section and a two-dimensional end face, said supporting means comprising a plurality of solid fibers conducting said radiation by internal reflection, the ends of said fibers forming an end face of said supporting means, said fibers constituted of material transparent to at least a part of said conducted radiation and of a high index of refraction, said members having a smooth external surface reducing the escape of said radiation from said members, said members having coating means mounted thereon and separating said members from each other, said coating means of material of a lower index of refraction than said members reducing further the escape of said radiation from said members, said photoelectric means mounted on said end face and receiving said conducted image radiation.

6. A device as defined in claim 5, in which said photoelectric means are mounted in contact with said end face.

7. A device as defined in claim 5 in which substantially each of said members has own coating means.

8. A device as defined in claim 5, in which said coating means have the thickness not exceeding a few microns, and in which said photoelectric means are mounted on the end face of substantially all said members, 9. A device as defined in claim 6 in which said members have their own coating means, said members mounted parallel to each other along at least the major part of their length.

10. A device as defined in claim 5 which comprises opaque means mounted between said members and in which said photoelectric means comprise photoemissive material and are mounted on the end face of substantially all of said members.

11. A device as defined in claim 27, in which said coating means have the thickness not exceeding a few microns, and in which said photoelectric means are of a photoemissive type and are in contact with the end face of substantially all said members.

12. A device as defined in claim 5, in which said coating means have the thickness not exceeding a few microns and which comprises opaque means mounted between said members and in which said photoelectric means are mounted on the end face of substantially all said members.

13. A device as defined in claim 12, in which said coating means have the thickness not exceeding a few microns, and in which said photoelectric means comprise photoemissive material and are in contact with the end face of substantially all said members.

14. A device as defined in claim 5, in which said coating means have the thickness not exceeding a few microns and which comprises opaque means mounted between said members, and in which said photoelectric means comprise photoemissive material and are mounted on said end face of substantially all said members.

15. A device as defined in claim 6, in which said members are provided with their own coating means, and in which said coating means have the thickness not exceeding a few microns, and which comprises opaque means mounted between said members, and in which said photoelectric means are of a photoemissive type.

16. A device as defined in claim 5, in which said members are provided with their own coating means, and in which said photoelectric means comprise photoemissive material, and in which said members are mounted parallel to each other along at least the major part of their length.

* * * * *

Disclaimer and Dedication 3,636,366.—*Edward Emanuel Sheldon*, New York, N.Y. OPTO-ELECTRIC SCREENS PROVIDED WITH LIGHT CONDUCTING MEMBERS. Patent dated Jan. 18, 1972. Disclaimer and dedication filed Nov. 11, 1976, by the assignee, *American Optical Corporation*.

Hereby disclaims and dedicates to the Public the remaining term of said patent.

[*Official Gazette January 18, 1977.*]